United States Patent
Wong

(10) Patent No.: US 9,129,179 B1
(45) Date of Patent: Sep. 8, 2015

(54) IMAGE-BASED OBJECT LOCATION

(75) Inventor: Peter C. Wong, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 378 days.

(21) Appl. No.: 13/468,944

(22) Filed: May 10, 2012

(51) Int. Cl.
*G06K 9/00* (2006.01)
*G06K 9/20* (2006.01)
*G06F 17/30* (2006.01)

(52) U.S. Cl.
CPC ............ *G06K 9/20* (2013.01); *G06F 17/30247* (2013.01)

(58) Field of Classification Search
CPC ............................. G06F 17/30247; G06K 9/20
See application file for complete search history.

(56) References Cited

U.S. PATENT DOCUMENTS

| | | | |
|---|---|---|---|
| 8,429,173 B1 | 4/2013 | Rosenberg et al. | |
| 8,520,979 B2 * | 8/2013 | Conwell | 382/305 |
| 2007/0269140 A1 | 11/2007 | Nagasaka | |
| 2010/0080470 A1 | 4/2010 | Deluca et al. | |
| 2010/0260426 A1 * | 10/2010 | Huang et al. | 382/218 |
| 2011/0211736 A1 | 9/2011 | Krupka et al. | |
| 2013/0013700 A1 | 1/2013 | Sittig et al. | |
| 2013/0054629 A1 | 2/2013 | Takami | |
| 2013/0129142 A1 | 5/2013 | Miranda-Steiner | |

OTHER PUBLICATIONS

"Final Office Action dated Nov. 12, 2014," U.S. Appl. No. 13/430,470 18 pages.
"Non-Final Office Action dated Aug. 7, 2013," U.S. Appl. No. 13/430,470, 14 pages.
"Final Office Action dated Jan. 27, 2014," U.S. Appl. No. 13/430,470, 18 pages.
"Non-Final Office Action dated May 21, 2014," U.S. Appl. No. 13/430,470, 18 pages.
US Notice of Allowance dated Mar. 23, 2015 issued in U.S. Appl. No. 13/430,470.

* cited by examiner

*Primary Examiner* — Tom Y Lu
(74) *Attorney, Agent, or Firm* — Hogan Lovells US LLP

(57) ABSTRACT

Disclosed herein are systems, methods, and non-transitory computer-readable storage media for identifying objects within images. Analysis are performed, comparing metadata, tags, and similarity of images, to determine trends and similarity. Based on these trends and similarities, metadata and tags are copied and generated, with the associated images then being more closely associated with one another. These images can then be organized in more meaningful and useful formats. The associated objects can also be used to provide a user with information about an object located in an image provided by a user, where the information can include location, pricing, availability, or other such information that can be determined from the metadata, tags, and other information associated with the images.

20 Claims, 11 Drawing Sheets

IMAGE-BASED OBJECT LOCATION

BACKGROUND

Users are increasingly turning to network resources, such as remote servers executing "in the cloud," to perform various tasks, such as to store data, process programs, and share information with multiple users and terminals across the world. In many cases, however, users are still limited to conventional approaches to locating information stored in the cloud. For example, a user wanting to determine where an object is available or to obtain pricing information for that object typically must perform a text-based search and navigate through a set of search results to obtain the desired information. In certain cases, the user might not know the basic information about the item needed to obtain that information. Various cues enable a user to attempt to determine an identity of an object, but that identifying information typically still has to be entered into a search engine or other such application. If the user is interested in obtaining information such as a location of such an item, yet another search may need to be performed, often requiring yet another application or service.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Various embodiments set forth herein relate to recognizing, managing, and/or utilizing types of information that may be shared between multiple instances of digital content. Examples of such digital content can include, for example, digital photographs, video files, audio files, holography, stereoscopic images, and the like. The types of information that may be common among the instances of digital content can include, for example, metadata, image data, descriptive text, tags, and other such information. In some cases, specific instances of digital content can relate to a common object, subject, or context, but might have different selections of the information associated therewith. Based at least in part upon some of these and other such commonalities, relationships between content instances can be determined and the types of information shared among content with similar aspects. Upon a user uploading or otherwise designating one or more images, computer resources can analyze the images to determine information about those images, which can include analyzing the tags and metadata, as well as potentially attempting to recognize one or more objects represented in the photographs. For example, an image matching service might be able to identify a type of object in one of the images, and an information extraction service might be able to determine, from the metadata of the image or other images containing that type of object, one or more locations where that type of object can be found. This information can be stored with the images, or in a separate data store, for example, and used for purposes such as indexing, search, etc. The information for the user's images also can be compared to, or aggregated with, other images stored on the cloud.

Figure 1:
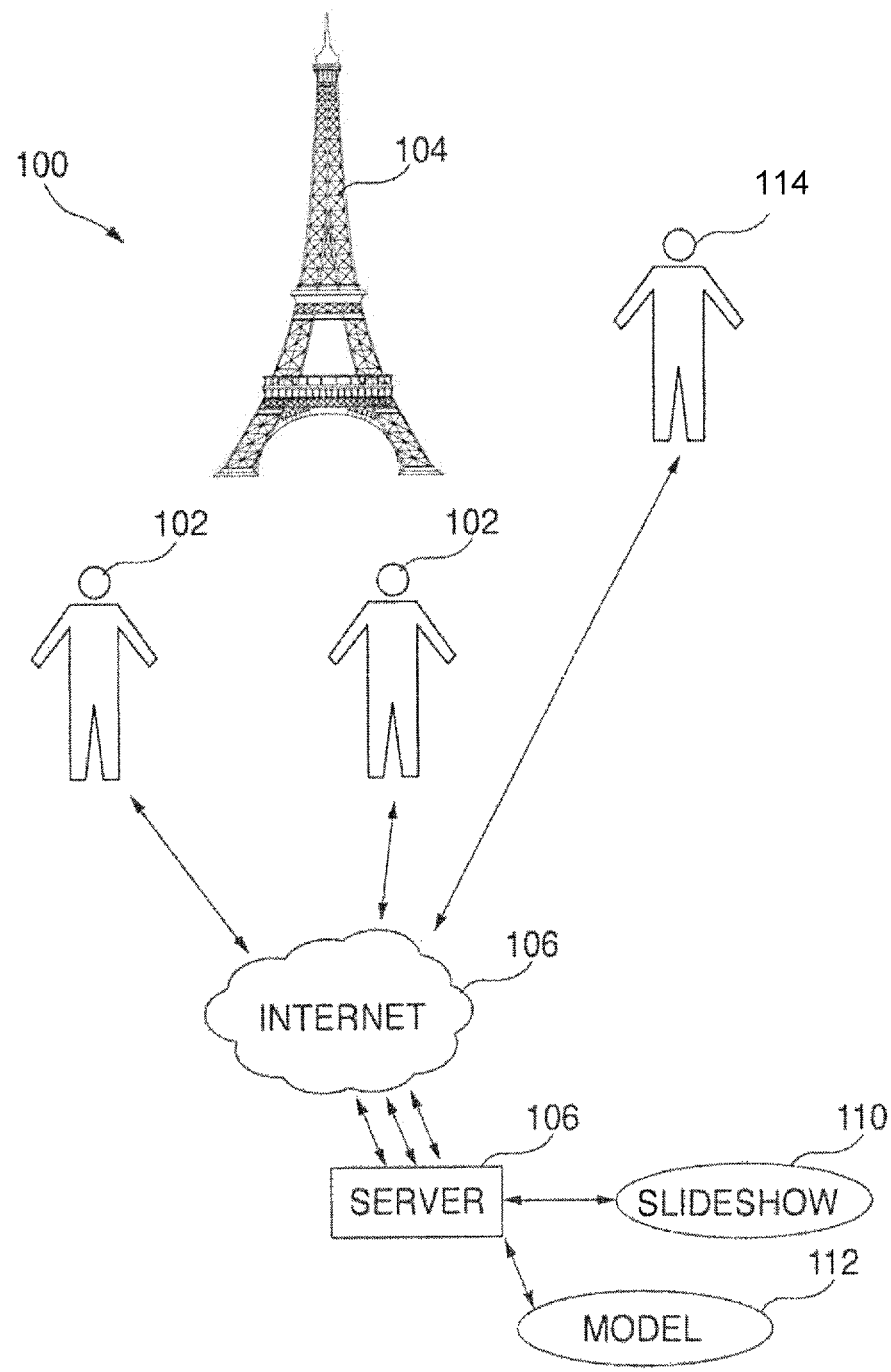
FIG. 1 illustrates an example system architecture.

FIG. 1 illustrates an example system architecture 100 that can be utilized in accordance with various embodiments. In this architecture 100, various individuals 102 are present near the Eiffel Tower 104. When any or all of these individuals 102 take photographs, the individuals can upload those photographs to at least one server 106 or other appropriate location. As illustrated, the individuals 102 can communicate with the server 106 through a network such as the Internet 104, as well as any cellular networks or other networks used to transmit such data. Upon receiving and/or storing the photographs, a system (or service) in accordance with at least one embodiment can perform an analysis on the photographs. The system can analyze information such as the metadata, user generated tags, and image data associated with each photograph to determine common trends, patterns, or information within the photographs submitted by the user. The system can then, based at least in part on these common trends and patterns, add metadata, user generated tags, or computer generated tags to the photographs as determined by the analysis.

Consider the example of a user 102 taking twenty photographs near the Eiffel Tower 104, tagging a single photo showing the tower with the hashtag #eiffeltower, and uploading those photographs to a cloud based server 108 through the Internet 106. These photographs were still frame (non-video) digital images taken using a smartphone having a location system, such as a global positioning system (GPS) receiver or a triangulation receiver, the metadata of each photograph has latitude and longitude coordinates associated with Paris, and further contains timestamps indicating the photographs were taken within several hours of one another. Upon receiving the photographs from the user, the system performs an analysis which considers the metadata and user generated tags of each photograph. In this case, the system recognizes that all twenty photographs were taken in a narrow span of time, with similar geographic metadata corresponding to Paris. The system can then generate a tag based on metadata, such as #paris, or #france, and apply those computer generated tags to the individual photos. In some embodiments, a user, camera, or application might also, or alternatively, add tags or metadata to the image before uploading the image, as may be based on the location of the camera at the time of capture, such as "Paris," "France," "Along the River Seine," etc.

A second analysis can also occur, in parallel or in series with the first, which performs a photoanalysis of each image.

This photoanalysis can recognize not only faces in the images, but objects, text, and structures as well. Continuing with the example of the user who took twenty photographs near the Eiffel Tower 104, the photoanalysis analyzes the photographs and determines that 15 out of the 20 photos, including the one with tagged #eiffeltower, contain at least a portion of the tower. The system can then copy the #eiffeltower hashtag onto the remaining 14 photographs, resulting in all 15 photographs containing at least a portion of the tower having the #eiffeltower hashtag.

In addition, in performing the photoanalysis, the system can identify objects that have not been previously marked or tagged by a user 102, generate corresponding tags, and insert those computer-generated tags into the images having the identified object. For example, perhaps a woman wearing a red dress appears in 5 photographs. The system can create a tag, such as #reddress, and insert that tag into the 5 photographs with the woman. In certain circumstances, the system will only generate tags when a trend or pattern between photographs is identified. In other circumstances, the system will generate tags for every object identified in the photograph. In yet other instances, the system will perform an importance analysis, in conjunction with the photoanalysis, to determine the importance of identified objects in the image. Approaches for determining a dominant object in an image, based on factors such as shape, size, lighting, focus, location in the image, and other such information are known in the art and as such will not be discussed in detail herein. Upon finding an object whose importance meets a threshold value, the system can generate a tag which can then be associated with the photograph. As an example, if a photograph contained a dog, a woman in the red dress, a blue balloon, the Eiffel tower 104, and some trees in the background, the system could place tags reading #dog #reddress #balloon #eiffeltower, but not any tag corresponding to the trees. In addition, the tags can be somewhat repetitive or vary in terms of specificity, such as #dog and #poodle, or #reddress and #womaninred.

Having performed these analyses, the system can perform an additional analysis comparing the user generated tags, the computer generated tags, and the metadata of each photograph to photos submitted by other users to Internet based servers, otherwise known as the cloud 108. This analysis, which is similar in form to the analysis comparing the metadata and tags of each photograph submitted to one another, expands the scope of images each photograph is compared against. The system can use the tags and metadata to determine information which also applies to a photograph being analyzed, copy that information, and associate that information with the photograph being analyzed in the form of metadata or a tag. For example, using a combination of tags and metadata, the system could determine that 90% of all the photographs showing the Eiffel. Tower 104 uploaded to the cloud 108 within the past 5 hours have the tag #love. The system can then associate the recently uploaded photographs showing the Eiffel Tower 104 with the tag #love. While a great number of tags assigned to a single photograph can be useful in certain situations, in general the system balances the number of tags associated with each image with the utility of those tags. In at least some embodiments, a tag must meet at least a minimum relatedness threshold, occurrence percentage, or other such metric in order to be associated with other images having a common aspect.

For example, the system can determine that 90% of all photographs taken between 10 AM and 2 PM having the Eiffel Tower 104 in the background and uploaded to the cloud based server 108 had multiple tags reading ∩paris #france #eiffeltower, whereas the remaining 10% were tagged with names corresponding to individuals in those pictures. In this case, the system can evaluate the relationship between the users 102 who uploaded the pictures, determine if they were friends with one another, and if a friendship is determined, share the tags between photos. If no friendship is determined, the tags corresponding to those individuals remain only with the photograph they were originally assigned to. As another example, suppose there is a carnival or fair occurring with the Eiffel Tower 104 in the background, and the photoanalysis identifies over one hundred important objects in the image. While the system can tag all one hundred plus objects, considering the past frequency with which users have assigned tags to images having those objects, as well as the subsequent usage of tags related to those objects, can aid the system in determining which tags will have the greatest utility and assign tags accordingly. So if a photograph showed a monkey on a swing, and the system was considering three tags: #monkey, #swing, and #monkeyonaswing, the system could consider that a user generated the tag #monkeyonaswing only once, whereas users generated the tags #monkey and #swing each over fifty times. In addition, #monkeyonaswing has never been used in a search or used to develop slideshows, models, or other presentations, whereas both #monkey and #swing have been used in various searches and presentations. Therefore, the system applies the #monkey and #swing tags, and omits assigning the #monkeyonaswing tag.

Having determined and assigned additional tags and metadata to each photograph, the system can organizes the photographs based on those tags and metadata. While one of the individuals 102 can continue to create classic, user defined, albums, systems configured according to this disclosure improve upon this by not relying upon individuals 102 to organize uploaded photographs. Instead, the system organizes uploaded photographs based on metadata and tags to form albums, slideshows, and presentations using relevancy calculations. This organization can occur immediately upon the user uploading the images to the cloud 108 (prior to any analysis); in parallel with analyses of the metadata, tag, and image; or after all the analyses are complete. The organization of the photographs can be based on a single individual, a group of individuals such as friends and relatives, or the public at large. Because of the tags and metadata available, the system can create slideshows 110 based on a common location, date, activity, detected objects, or identified people. Individuals 102 can then consider viewing only their photographs, related photographs taken by their friends, or related photographs available on the cloud based server 108.

Consider the example of a woman travelling in France for two weeks taking hundreds of photographs, approximately half using a smartphone (containing date, time, location metadata, and some tags) and half using a point-and-click digital camera (data and time metadata only). This woman meets two friends in Paris for a day and tour the Eiffel Tower 104 together. The woman can upload her hundreds of photographs to the cloud 108 immediately after taking the photographs, such as by using a wireless Internet 106 connection, cellular connection, or other such network. The user can alternatively upload the images at a later time using a wired or wireless network connection as known for such purposes. After receiving the images, the system can begin analyzing and/or organizing the photographs. In this example, the system can create an album of the woman's pictures taken while in France, prepare a slideshow related to the Eiffel Tower 104, add photos related to the friend both to the friend's albums and albums/slideshows related to the friend, and associate the photos with other photos, slideshows, and albums available on the cloud 108. Depending on the particular trends, locations visited, and objects detected, the system can create additional slideshows, albums, and presentations using the uploaded photographs.

The system can, in organizing albums and slideshows 110, create presentations based on a combination of metadata and tags. As an example, the system analyzes the photographs and creates a time lapse slideshow using the photographs from multiple individuals 102 throughout a single day. In one instance, this is accomplished by comparing the tags of the photographs, identifying a common trend in the tags, and performing a second photoanalysis to determine if the angles of the photographs are aligned within a threshold. In another instance, the second photoanalysis is absent, and a slideshow is prepared based exclusively on a common tag and corresponding metadata.

In addition, the system can create models using the photographs from the individuals 102. In one example, the system "stitches" the photographs together to create larger photographs. In another example, the system constructs a 3-dimensional model using the photographs of multiple users, to create a virtual landscape the user can explore. This model can be constructed exclusively from the photographs of the user, or alternatively, can rely upon a combination of cloud based photographs and private photographs. As an example of a combination, suppose one took many photographs of the Eiffel Tower 104, but failed to have sufficient for the system to construct an adequate model. The system can rely upon a combination of personal photos and cloud photos to generate a virtual model of the tower, then rely exclusively on the personal photos to populate the scenery or people present within the model. The system can also search the cloud for photographs with corresponding metadata/tags and use that information to build a more complete model and more accurately fill in the scenery and people of the model. Using this system, a man proposing to a woman on the Eiffel Tower 104 could have dozens of photographs taken, uploaded to the cloud, and a model could be generated using those dozens of photographs to present a virtual replication of the event.

When users 102 upload photographs to the cloud 108, the system can send a notice to individuals or organizations interested in photographs identifying a particular object. For example, a user can create a request to be notified every time a photo is processed by a system or service in the cloud, for example, containing the Eiffel Tower 104 or tags such as #eiffel or #eiffeltower. Individuals receiving this notification can provide additional tags for the photograph, modify their notification parameters, and add the photograph to personal albums, slideshows, and presentations. Consider a user desiring to receive notices when new images of poodle dogs are added to the cloud. The user can communicate to the system that they wish to be notified instantly of any new poodle images, receive a daily listing of all the images, or receive only the top N most popular images each month. While these time periods can vary, they illustrate that the user can set the frequency and format of the notifications received. When the notification is received the user can add additional tags to be associated with the photograph.

Because of the potential for abuse, individuals 102 who upload photographs to the cloud 108 can determine if they will share their photographs publically, only with friends, relatives, and associates, or if they will not share their photographs and instead keep them private. In addition, these same individuals 102 can decide to share photographs anonymously, or block accessibility to tags created by other users. Again using the poodle example, a third party could tag a photo with #ugly, and hurt the feelings of the uploading individual. To prevent injury users can therefore control privacy settings regarding who can see photographs uploaded to the cloud, who can tag or otherwise associate information with the photographs, and when those photographs can be shared with others in a slideshow, album, or other presentation. In some embodiments, a user can choose to share the photos only after people are removed from the images. For example, a service can aggregate images for a particular location captured from a similar point of view. The service can determine regions of each image that do not contain a person. These regions can then be used to fill in regions of a user image that show a person, effectively removing the person from the image. In some embodiments, the service might store both the original and the manipulated image, but might only share the image where people have been removed.

Also illustrated in FIG. 1 is another user 114 who has obtained a picture of the Eiffel Tower, whether by taking the picture, receiving the picture from a friend, locating the image on a Web site, or another such approach. The user might be interested in determining where that object is located, in case the user forgot or might not ever have known. In other cases, the user might be interested in determining any location where an object of that type might be found. The system in this example enables that user to upload that image to the cloud, whereby a system or service is able to analyze the image, using an object recognition algorithm or other such process, and identify that the image includes a view of the Eiffel Tower. Assuming the provided image does not have metadata or geographical information that enables the location to be determined from the image, the system or service can analyze the stored image data that was provided by other individuals 102, and can determine location based metatags, such as #paris or #france, as well as geographical data that might provide a more accurate determination of location. Depending upon the algorithm, for example, the service also might return that the type of object also can be located in Las Vegas, depending on whether background images or other such information can be used to narrow down the location, as well as whether the user wants information about other locations where this type of object can be located. Based on information associated with images captured or provided by other individuals or sources, the user can determine the locations of the Eiffel Tower in both Paris and Las Vegas. If the user forgot where the picture was taken, for example, but took other pictures around the same time, the metadata for other pictures captured by that use within a designated time of the capture of the image of the Eiffel tower can also be analyzed to attempt to determine the approximate location of the tower. For example, if metadata for images captured before and after the Eiffel tower within a couple of hours indicate that the user is in Paris, the system can indicate to the user that the Eiffel tower likely is also located in Paris.

In at least some embodiments, the user 114 also might be able to locate places where the user can purchase a version of that object. For example, the user might have captured the image of the Eiffel Tower and know that the tower is in Paris. The user might instead be interested in purchasing a toy or model of the Eiffel Tower to take home as a souvenir. Or, the user might not be in France at all but is looking for a location from which a model of the Eiffel Tower can be purchased for a school play or other such reason. In at least some embodiments, the user can upload the image to the cloud and specify that the user wants location information. In some embodiments, the user can also specify that the user is looking for a consumer good, toy, model, or other such category of result. A cloud-based service receiving the image can analyze the image to determine that the image includes the Eiffel Tower, and can use the parameters of the request to determine that the user wants to find locations where the user can purchase a version of the tower. In some embodiments, a current location of the user can be determined as well, such as by analyzing image information sent with the request, user account information, a network address of the user, or other such information. The system can analyze the metadata or other information stored with images from other users, to locate tags such as #toy or #model, address information, and other such data. Based at least in part upon the obtained data, the system or service can rank the results, such as by proximity to the user, and can return information indicating one or more locations nearby from which the user can obtain the object. Depending on the type of information available, the user might also be able to obtain data such as pricing, materials, dimension, user ratings, and the like. Various other types of information can be obtained as well within the scope of the various embodiments.

Figure 2:
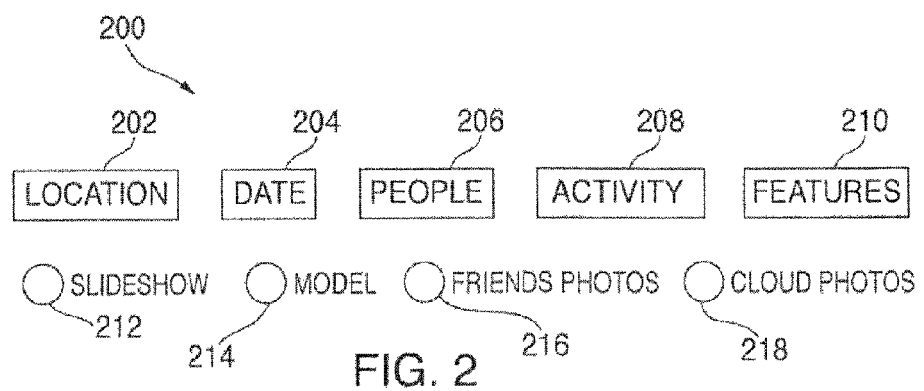
FIG. 2 illustrates an example user interface.

FIG. 2 illustrates an example user interface 200 with some privacy features and various options for viewing images. In one option, a user can select to view photos by location 202. Upon clicking the location interface 202, the user is presented with a list of locations where photographs were taken. This list can be hierarchical, having a folder or topic such as "Texas" with a subfolder of "Austin" and another subfolder of "Houston." Other example options for how the system arranges the photographs are size, date, latitude, longitude, length of slideshow, image size, and number of photographs available. If the user is utilizing a mobile device or other device capable of determining a current location, the user can instead ask to receive images for objects or places near the current location of the device. Alternatively, if a user wanted to see some or all photos having a latitude similar to that of New York City, the user could enter coordinates such as 40° N, and a listing of those cloud based photos having metadata near 40° N would appear. Users can similarly select the Date 204 associated with photos, viewing photographs chronologically, by specific date, or by specific time periods or intervals.

Selection of a People 206 option can take advantage of facial recognition photoanalysis, as well as tagging. Using a combination of recognizing user generated tags, photoanalysis, and generating additional tags, photos containing a specific individual can be identified and organized. For example, if the user decided to organize the photographs by People 206, options could be presented to select from "Mom", "Dad", and "Johnny." Similarly, the Activity 208 option uses tags and information associated with actions in the photograph. For example, if a series of photographs contained the tag #skydiving, upon selecting the Activity 208 option those photographs could appear as a slideshow or other presentation. The Features 210 option likewise identifies specific objects, landmarks, or sites and lists them as available for viewing.

Users can enable these example viewing options in conjunction with one another. For example, by combining location and date functions, a user could discover what the weather in a particular location was on a particular day. If a user wished to see photographs of their Mother skydiving, the user can select the People 206 and Activity 208 options together. If "Mother" and "skydiving" produces too many results, the user could continue to restrict the number of options by placing a Features 210 restriction, such as "Golden Gate Bridge", or a Date 204 restriction, such as "Mar. 24, 2010", to narrow the search results. These restrictions and viewing options do not apply exclusively to one's personal photographs. As illustrated, the user can select to include in this organization and searching of photographs the photographs and images of Friends 216 and of the Cloud 218. In addition, the manner of presentation can vary. Examples of this variation are standard albums, slideshows 212, and virtual models 214. As the user selects these options, the manner in which the system presents the various viewing options to the user can likewise shift. For example, upon selecting Model 214 the system could present the user with a smaller user model, enabling the user to envision how the full size virtual model would look.

Figure 3:
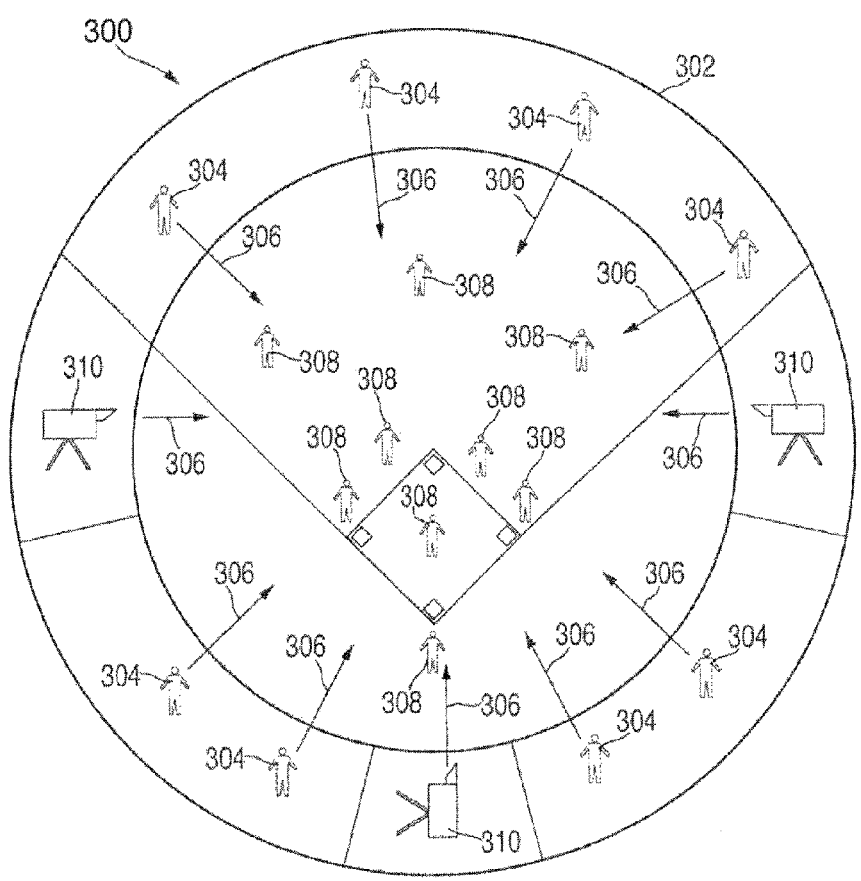
FIG. 3 illustrates an example system having a combination of live image streams and single image feeds.

FIG. 3 illustrates an example system 300 having a combination of live image streams and single image feeds. In this example system 300 a baseball game is occurring in a stadium 302, with a number of fans 304 are watching teams 308 play ball. In addition, television crews are using digital video cameras 310 to record the game and broadcast it to a wider viewing audience. Each fan in the stadium 304, and each video camera 310, contains a unique point of view 306 of the game. As fans 304 in the stadium take photographs, sometimes with tags, and upload those photographs to the cloud, each photograph can be analyzed and organized as previously described in FIG. 1. In addition, however, the live stream from the video cameras 310 can also be uploaded to the cloud, and each individual frame of the video stream can be analyzed in a similar manner. Whereas in FIG. 1, albums, slideshows, models, and other presentations were prepared using multiple individual photographs, here those same presentations are prepared using individual frames from video cameras 310. Individual frames can be analyzed by a system configured according to this disclosure to perform comparisons of metadata, user generated tags, computer generated tags, and photoanalysis both of human beings and non-human objects. While the system can be configured to review every individual frame, depending on frame rates it can be a more efficient use of resources to establish a sampling rate prior to performing any analyses.

As a first example, the fans 304 in the baseball are watching the game with cameras 310 recording. Suddenly a player hits his $3000^{th}$ homerun, and every fan 304 in the stadium is taking photographs. As those fans and the cameras upload their photographs and individual frames to the cloud, albums, slideshows, and models are prepared having been organized with tags and appropriate metadata. Publically available slideshows and private slideshows are prepared containing photographs from individual users 304 and frames from the cameras 310. These slideshows can contain images constructed by stitching together multiple photographs. The system creates virtual models which allow a user to later view the celebration as if they were on the field when the homerun was hit. In addition, because of the number of images available between the live feeds 310 and the photographs taken by fans 304, users viewing the 3-D virtual model can play the model from various angles and perspectives. For example, the user can then watch the batter as he runs the bases virtually from the pitcher's mound, the outfield, or accompany the batter as he makes the round.

As a second, related example, rather than fans utilizing the slideshows and models, entities such as sports teams, broadcasters, streamer services, and others can use the photographs and video feeds to create slideshows and virtual models, as well as to offer replays from various angles, three-dimensional views, etc. Considering a slideshow, the system can perform a photoanalysis to determine where players corresponding to particular numbers are found on the field at a given moment and use that information to show trends or patterns. Considering a model, the system performs the same task, but provides a unique perspective useful to players. For example, the model can show a quarterback, a tight end, or a safety how a given formation or play will look from his perspective. Rather than requiring time during practice to memorize the particular looks of an opposing team, the system can generate these looks and present them to a team in the form of a model, which the system can rapidly update. In addition, the model can "play", and show how the play will look at various points in time from various perspectives.

Similarly, a user can utilize this information to determine where the player was when the player hit his 3000$^{th}$ homerun. For example, the user might see an image on a Web site that shows the user hitting the home run, and the user wants to obtain information about the hit. The user can upload the image to the cloud, or have the image analyzed locally on the device and feature vector or other descriptive information uploaded, in order to find information associated with matching images. If the system can match the image against one or more of the images of the hit uploaded by other users, the system can determine when and where the image was taken based at least in part on information stored with the images, and can provide that information to the user. The system can also provide other tags or information associated with the image, so the user might be able to determine not only when and where the hit occurred, but information about that night, who pitched the ball, and other information that users might have associated with one or more images of the hit. The user might also be able to get information about locations where the user can purchase a copy of an image of that hit, such as a local sporting goods store selling a baseball card, a local mall selling a poster, etc.

Figure 4:
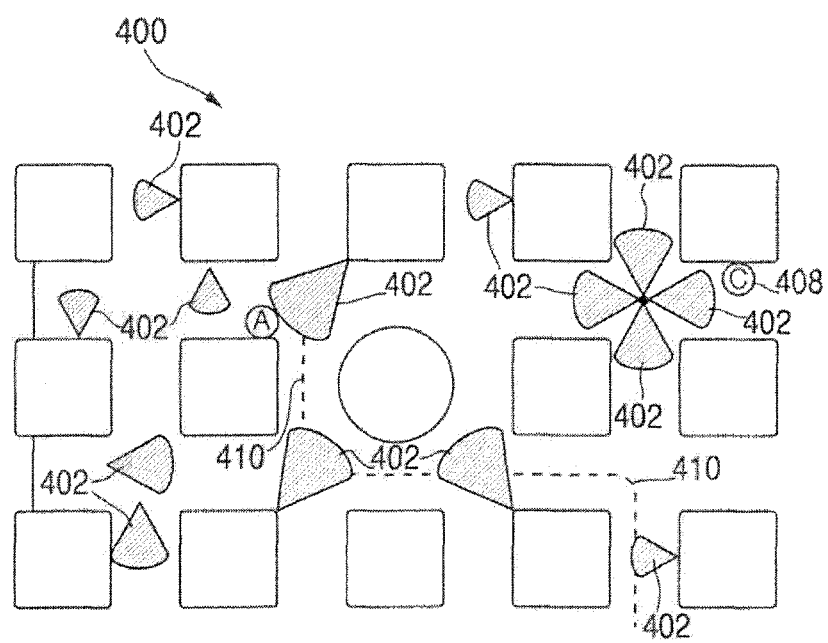
FIG. 4 illustrates an example system having multiple live image streams.

FIG. 4 illustrates an example system 400 having multiple live image streams 402. In some instances, a user might be interested in determining a location any time a certain type of object is located in the image information uploaded to the cloud. The live image streams 402 when uploaded can be analyzed in a manner similar to that described with respect to FIG. 1 and in FIG. 3. That is, each image frame or sampled image frame can be analyzed, and metadata, tags, and other such image data analyzed to create additional tags identifying people, objects, and other circumstances. The system then can compare these images to other photographs or images on a network or cloud to determine and share additional trends. In FIG. 4, the system 400 represents a city with a multitude of cameras 402. These cameras 402 can be traffic cameras, surveillance cameras, or cameras belonging to a particular shop or store. The cameras also can include cameras of individuals in that city who upload images or video to the cloud. As certain types of objects or circumstances are detected, notices can be sent out to corresponding individuals, departments, or agencies. For example, if an accident occurs within view of a camera, an image of the accident might be matched against other images to determine that the image shows an automobile accident, and the system can tag images associated with the accident and archive them for future legal and insurance issues. The system can also notify police to send a patrol nearby, ensure everyone is fine, and perhaps begin directing traffic. If the system detects smoke through the photoanalysis, the system can automatically send notice to the fire department. The location of the fire can be determined by the data tagged by the camera, where available, or can otherwise be determined by matching images of the surrounding buildings with images uploaded by other users, and analyzing the location data associated with those images.

As another example, consider if a bank robbery at A 406. The bank camera 402 is connected to the cloud, and tags the getaway car as a #whitebronco. The tag could be applied manually by a person at that location, or a captured image could have been analyzed and detected a bag of money, ski mask, weapon, or other type of object that might be indicative of a crime being committed. The police department can immediately receive notice of the bank robbery and can be provided information about the to be on the lookout for the white bronco. Other cameras 402 in the vicinity begin actively searching for a white bronco using photoanalysis. As the white bronco follows an escape route 410 out of town, cameras 402 continually record the vehicle, analyze image frames, recognize that this is the same white bronco seen moments earlier at another camera 402, tag the image, and report to the police the current location of the escape vehicle. Also, any user nearby who captures and uploads an image showing the white Bronco can have that information associated and utilized in locating the vehicle as well. The police can then rapidly close in and confront the escape vehicle.

Yet another example considers surveillance cameras 402 used to prevent crime. These cameras 402 allow police and other agencies to view selected areas at all hours without being needing to be physically present. As discussed, however, these cameras 402 can capture images that can be analyzed to attempt to identify specific objects, such that the images can be tagged with the appropriate tags or information. Other users capturing images in those areas can have their images associated with the images of the area, and any tags or contents of the user images can be analyzed as well. Upon noticing any of the targeted objects in any of the associated images, an appropriate action can be taken such as to notify police. The ability to associate information not only from the fixed cameras 402 but also any other cameras in the area can help to increase police response time. Consider a surveillance camera 402 recording a group of individuals on a street at B 408. The camera 402 analyzes image frames, detects an object, identifies that object as a weapon or specific vehicle, tags the frame, and notifies authorities that an object of interest has been detected at B 408. Police can then be routed to B 408 to maintain the peace.

Information aggregated from multiple sources can be used to locate other objects or items of interest as well. For example, a user might see a vehicle that the user is interested in. The user may not know the exact model, package, paint color, or other information that might normally need to be entered to find data about that vehicle. An approach in accordance with various embodiments enables the user to capture one or more images, or video, of the vehicle, and upload the image and/or video data to an appropriate location in the cloud for analysis. As discussed, a matching service can determine the type of object, such as the make and model of the car, approximate model year, color, and other such information. Another service then can attempt to locate other images showing that type of car, and can use the associated data and/or metadata to provide the user with information about locations of such a car nearby. In some embodiments, the user might be able to specify (manually or as part of an application) that the user is interested in finding dealers where a car like this is in stock and available. Accordingly, the system can analyze the metadata to determine such information, and can provide the locations of those cars to the user. An application executing on a client device can also then potentially provide the user with information extracted from the image database, such as pricing information, options, etc. In some embodiments the application can also provide the user with information such as a contact number, a Web address, a physical address, or other information the user can use to further inquire about the vehicle. In some embodiments, a user might be able to express interest in that type of car, and then request to be notified when an instance of that type of vehicle becomes available within a determined radius, geographical region, or other such location. A user also might be able to specify other criteria as well, such as "new" or "used," and those criteria can be used for matching as well.

Images thus can be used to locate various types of object using data associated with other images provided by other users or sources. Various types of information can be provided for the objects once located, as may be based on a selection or current activity of the user. As discussed, the user also can specify interest in a type of item, and submit a request to be notified when an object of that type becomes available, or is located near a present location, for example, based at least in part upon the data or metadata associated with images in an aggregated user image store.

Figure 5:
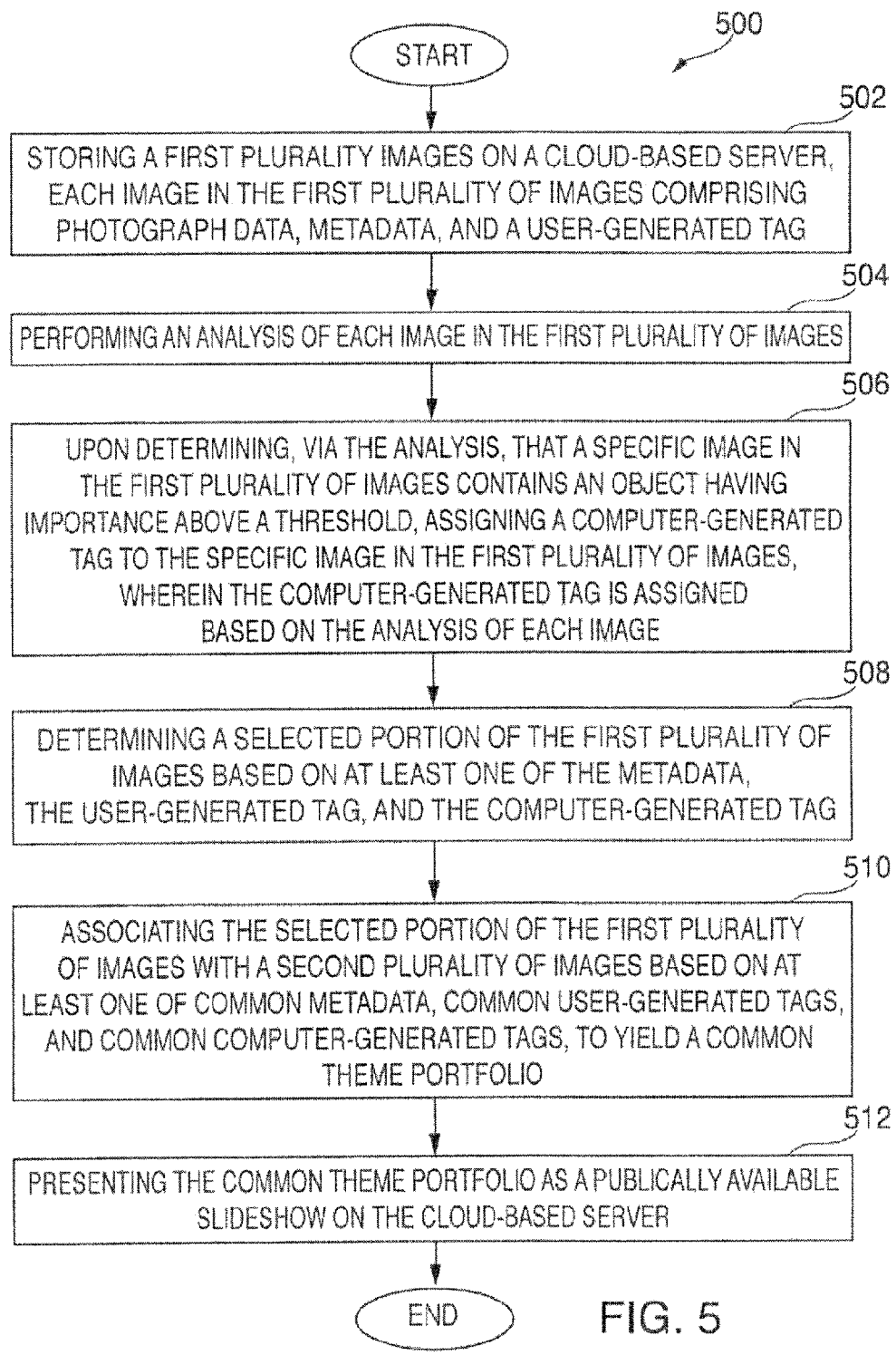
FIG. 5 illustrates a first method embodiment.

FIG. 5 illustrates a first method embodiment (500). A system configured to practice this method stores a first plurality of images on a server, each image in the first plurality of images comprising photograph data, metadata, and a user-generated tag (502). Upon identifying an object within a specific image, the system assigns a computer-generated tag to the specific image in the first plurality of images, where the computer-generated tag is assigned based on the object identified (504). Object identification can be accomplished using an object recognition algorithm. The system then determines a selected portion of the first plurality of images based at least one of the metadata, the user-generated tag, and the computer-generated tag (506) and associates the selected portion of the first plurality of images with a second plurality of images based on at least one of common metadata, common user-generated tags, and common computer-generated tags, to yield a common theme portfolio (510). The system can then provide the associated images as sharing a common theme, for example, which can be exposed through a publically available service, whether as a slideshow on the server (512), as a three dimensional model, or another such presentation. In addition, the system can connect to the server through the Internet, wirelessly, or through a local, wired, connection.

Figure 6:
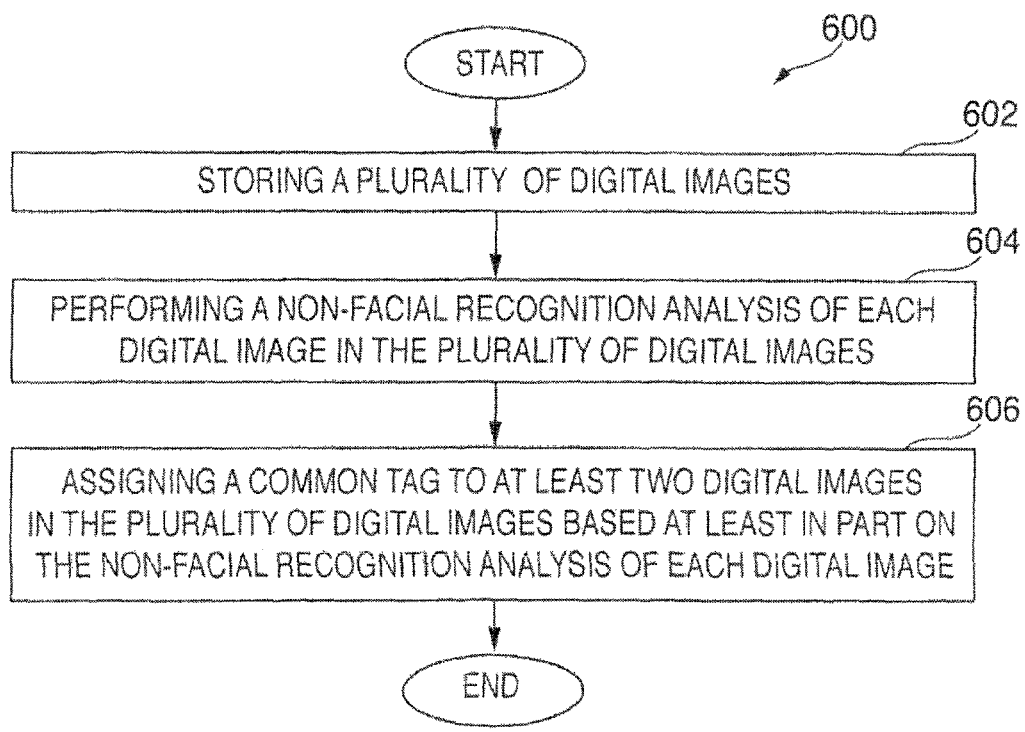
FIG. 6 illustrates a second method embodiment.
Figure 7:
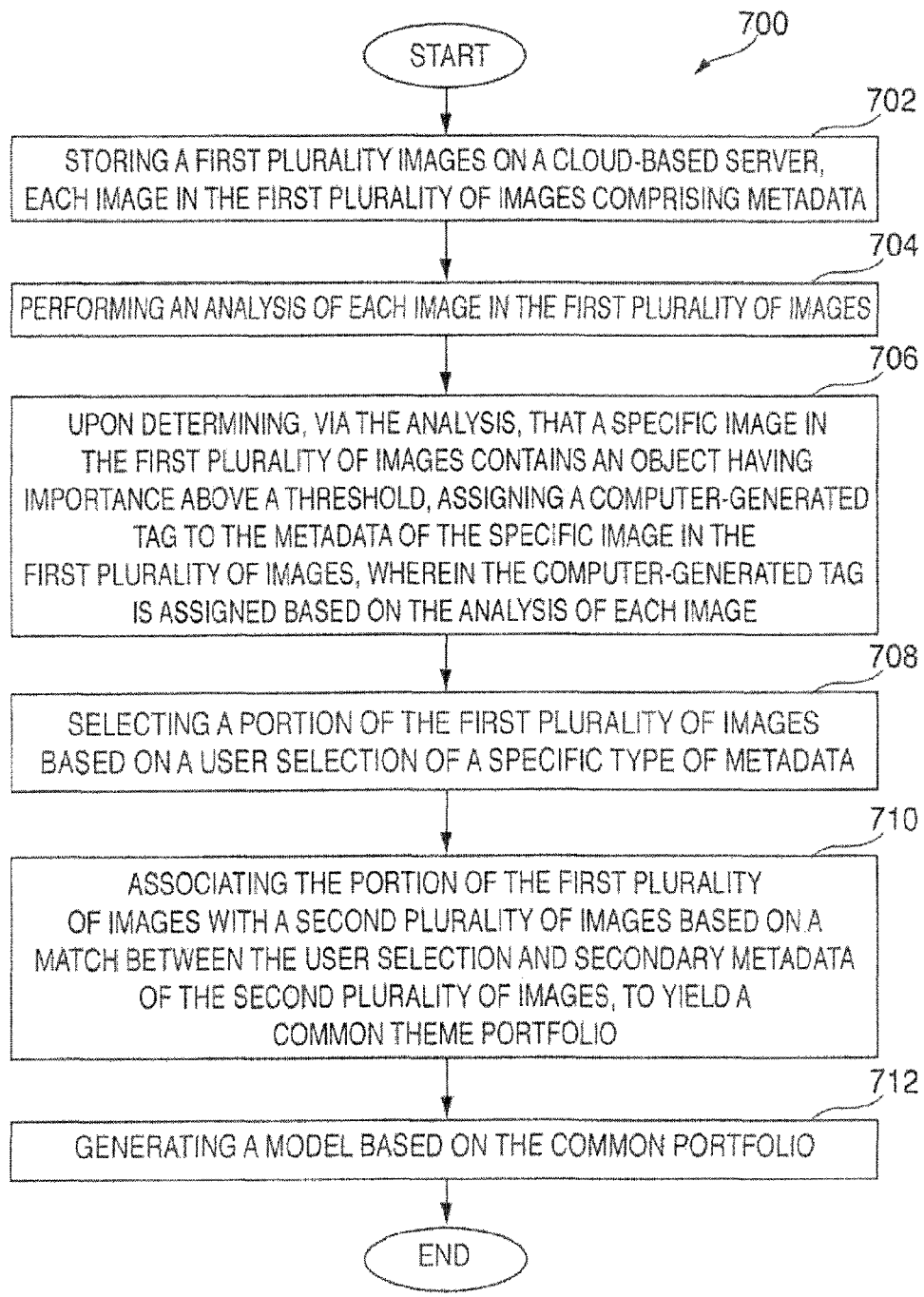
FIG. 7 illustrates a third method embodiment.

FIG. 6 illustrates a second method embodiment (600). The system in this configuration receives a plurality of digital images (602), then analyzes each of the plurality of images using at least one image matching algorithm to attempt to identify at least one object in each digital image in the plurality of digital images (604). The system then assigns a common tag to at least two digital images in the plurality of digital images determined to contain an identical object (604). The tags used in this embodiment, or any embodiment, can comprise hashtags (#tag), or other forms of tags, including barcodes, QR codes, and image tags. If performed on a server, there is no need to communicate the plurality of digital images to a server. However, in instances where the system performing this method is not a server, the method can further entail communicating the plurality of digital images to a server. A user can then locate other images, or data from other images, relating to at least one object in the image data. As discussed, a user can upload image data in some embodiments to determine information about an object in that image data as provided by analyzed images submitted by other users FIG. 7 illustrates a third method embodiment (700). The system stores an image on a cloud-based server, the image comprising metadata (702), and performs an analysis on the image to identify objects (704). This image can be received wirelessly, and in many instances will be received from a smartphone. Upon identifying an object in the image, the system assigns a computer-generated tag to the metadata of the image, wherein the computer-generated tag is assigned based on the object (706). The system then receives a user selection of a specific type of metadata (708) and associates the image with a plurality of images based on a match between the user selection and plurality metadata of the plurality of images, to yield a common theme grouping of image data (710). The user selection can be based on the system providing to a user an option based on the object detected. The system then generates a model based on the common theme (712).

Figure 8:
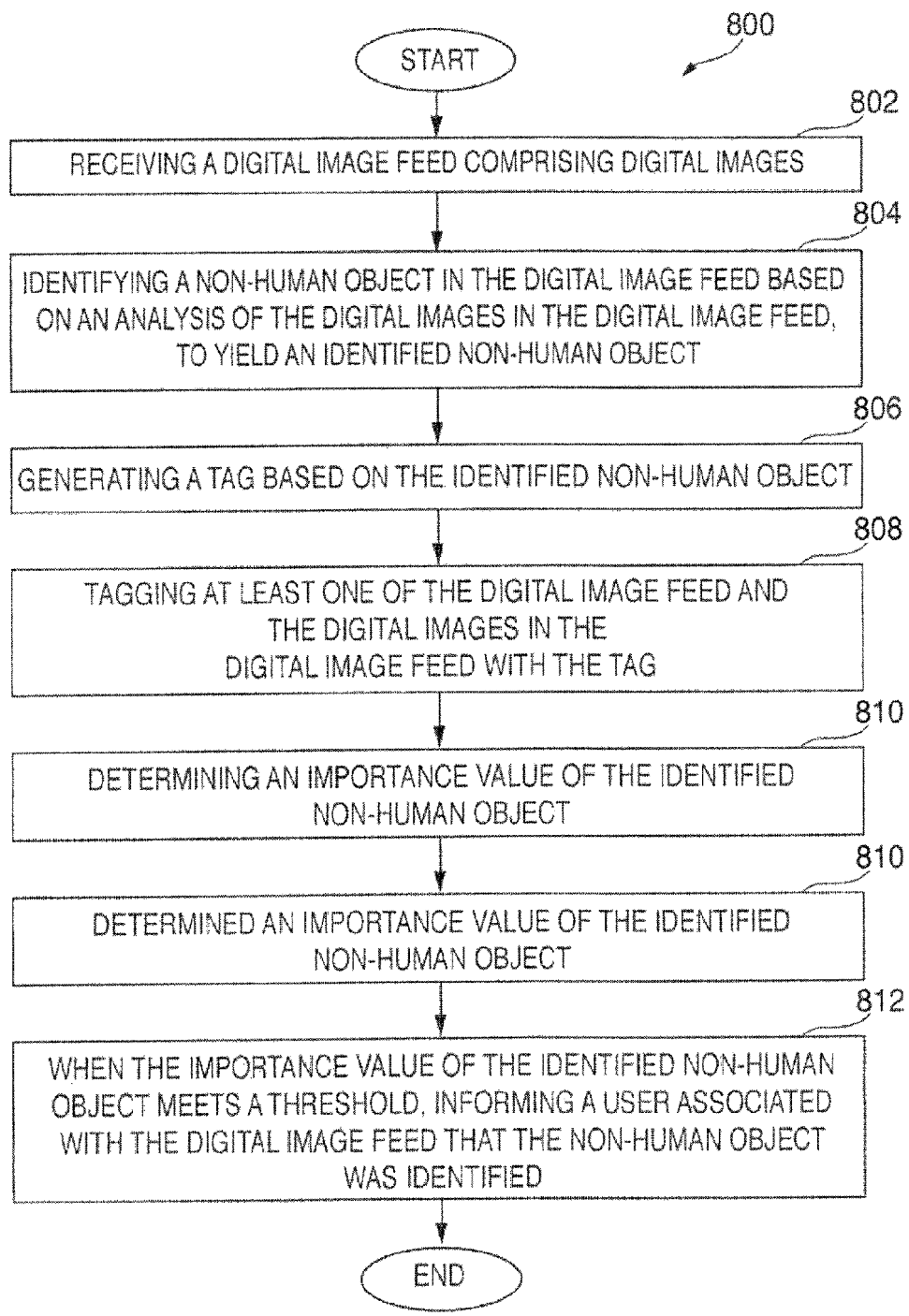
FIG. 8 illustrates a fourth method embodiment.

FIG. 8 illustrates a fourth method embodiment (800). A system configured to according to this embodiment receives a digital image feed comprising digital images (802) and identifies a non-human object in the digital image feed based on an analysis of the digital images in the digital image feed, to yield an identified non-human object (804). In identifying the non-human objects, images can be selected from the digital image feed based on a sample rate. This sample rate can be determined by a human, or determined by the system based on the current needs and occurrences. In identifying the non-human object, the system can consult with an entity or service, such as a machine vision system, to identify the non-human object. The system then generates a tag based on the identified non-human object (806) and tags at least one of the digital image feed and the digital images in the digital image feed with the tag (808). Upon tagging either the feed or the image, the system determines an importance value of the identified non-human object (810) and, when the importance value of the identified non-human object meets a threshold, informs a user associated with the digital image feed that the non-human object was identified (812). For instance, if the non-human object is a weapon or certain type of paraphernalia, the police can be informed or another such action can be taken. In addition to informing the user, the system can instruct other digital feeds to search for either the identified object or for similar objects.

Figure 9:
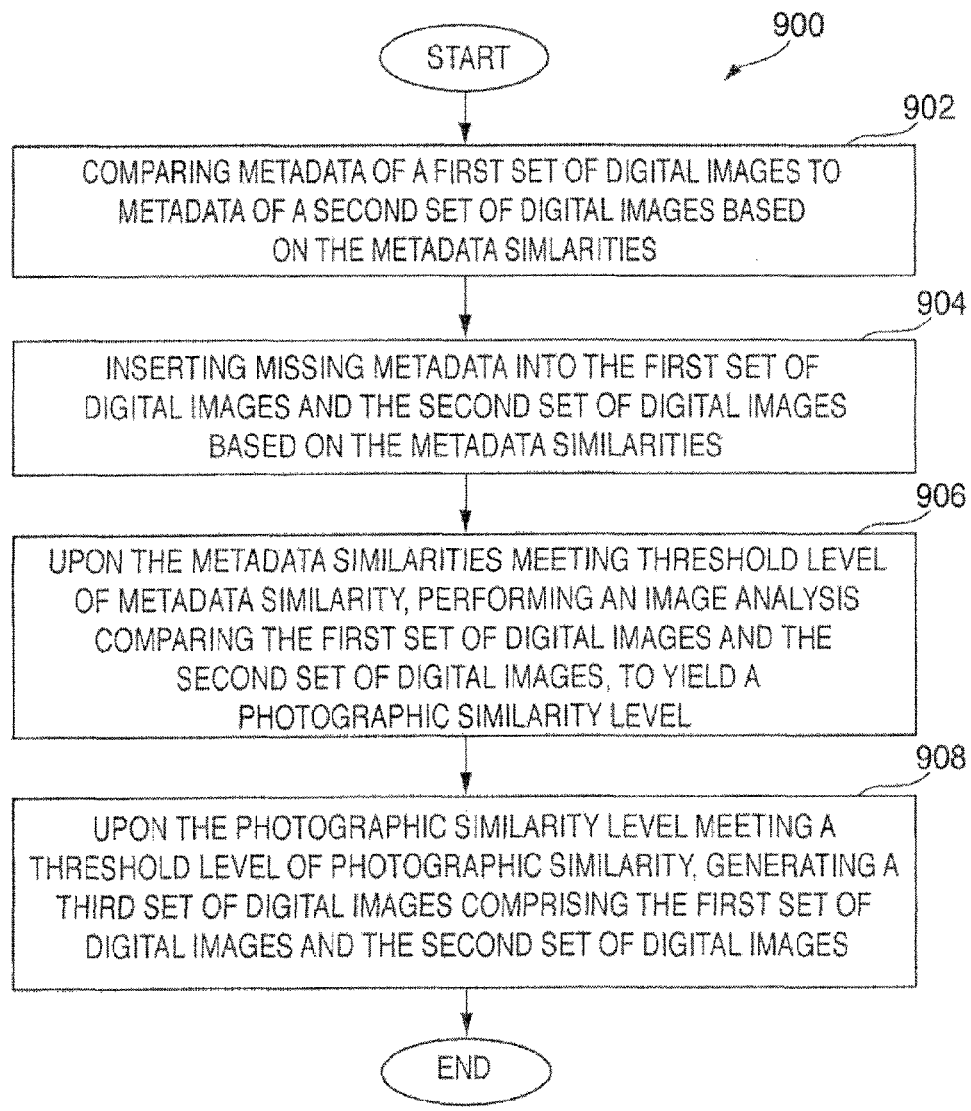
FIG. 9 illustrates a fifth method embodiment.

FIG. 9 illustrates a fifth method embodiment (900). In this embodiment, the system compares metadata of a first set of digital images to metadata of a second set of digital images to yield metadata similarities (902), then inserts missing metadata into the first set of digital images and the second set of digital images based on the metadata similarities (904). When the metadata similarities meet a threshold level of metadata similarity, the system performs an image analysis comparing the first set of digital images and the second set of digital images, to yield a photographic similarity level (906). When this photographic similarity level meets a threshold level of photographic similarity, the system generates a third set of digital images comprising the first set of digital images and the second set of digital images (908). The system can then generate a model using this third set of digital images. In addition, prior to starting this method, the system can request confirmation from a user that they wish to perform this method, that is, that they wish to share the first set of digital images to a second set.

Figure 10:
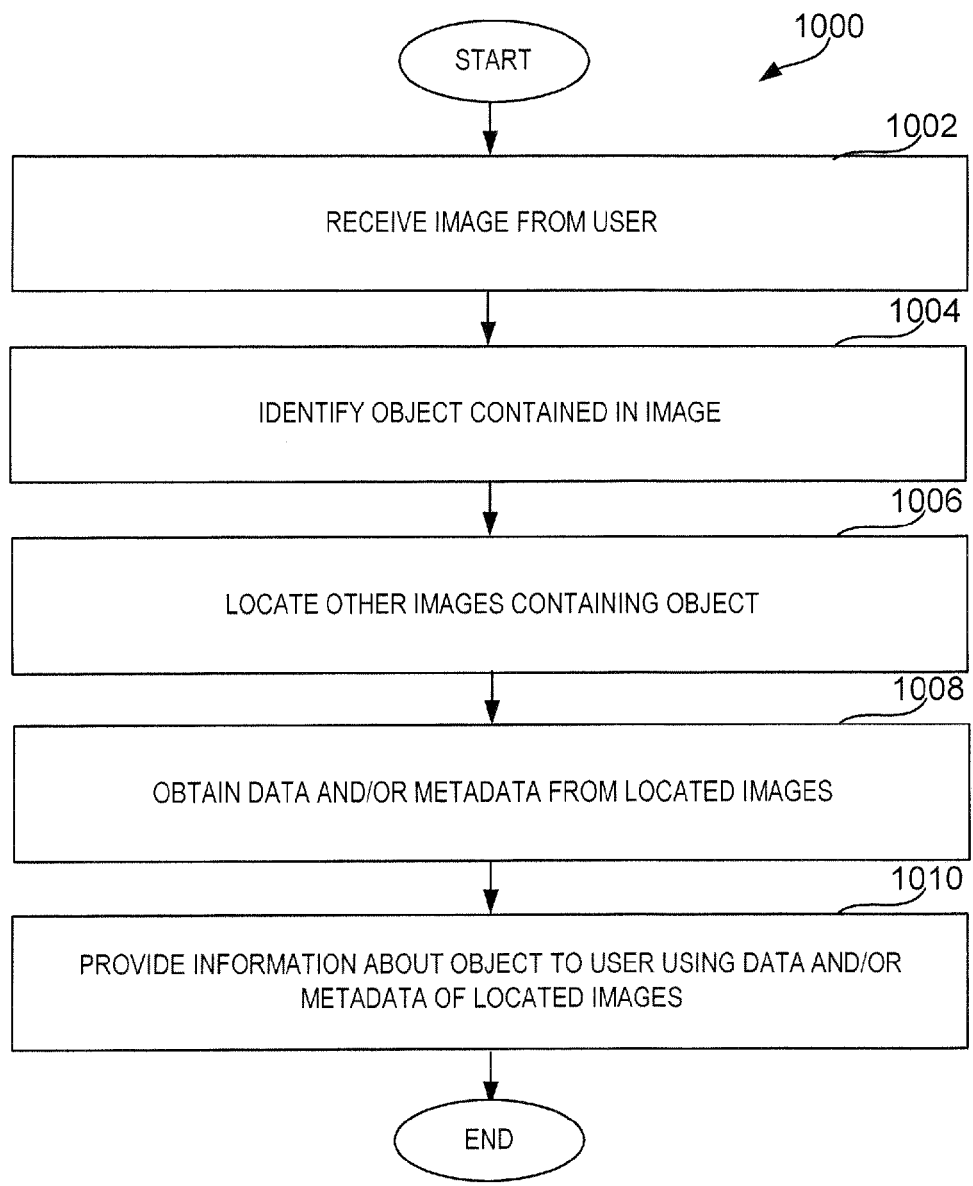
FIG. 10 illustrates a sixth method embodiment.

FIG. 10 illustrates a sixth method embodiment (1000). In this embodiment, a user identifies an object that is of interest to the user. The user captures an image of that object, and causes data for the image to be uploaded to an image matching service. The image is received (1002) and analyzed to identify an object at least partially contained in the image (1004). Once identified, the service locates other images that were uploaded by other users that contain a view of that object (1006). The service can analyze the data and metadata of those located images to determine information about the object (1008). The service can then provide information about that object to the user (1010), such as by sending the type of requested data to the user. The requested type of data can include any appropriate type of data, such as may relate to location, pricing, identification, etc.

Figure 11:
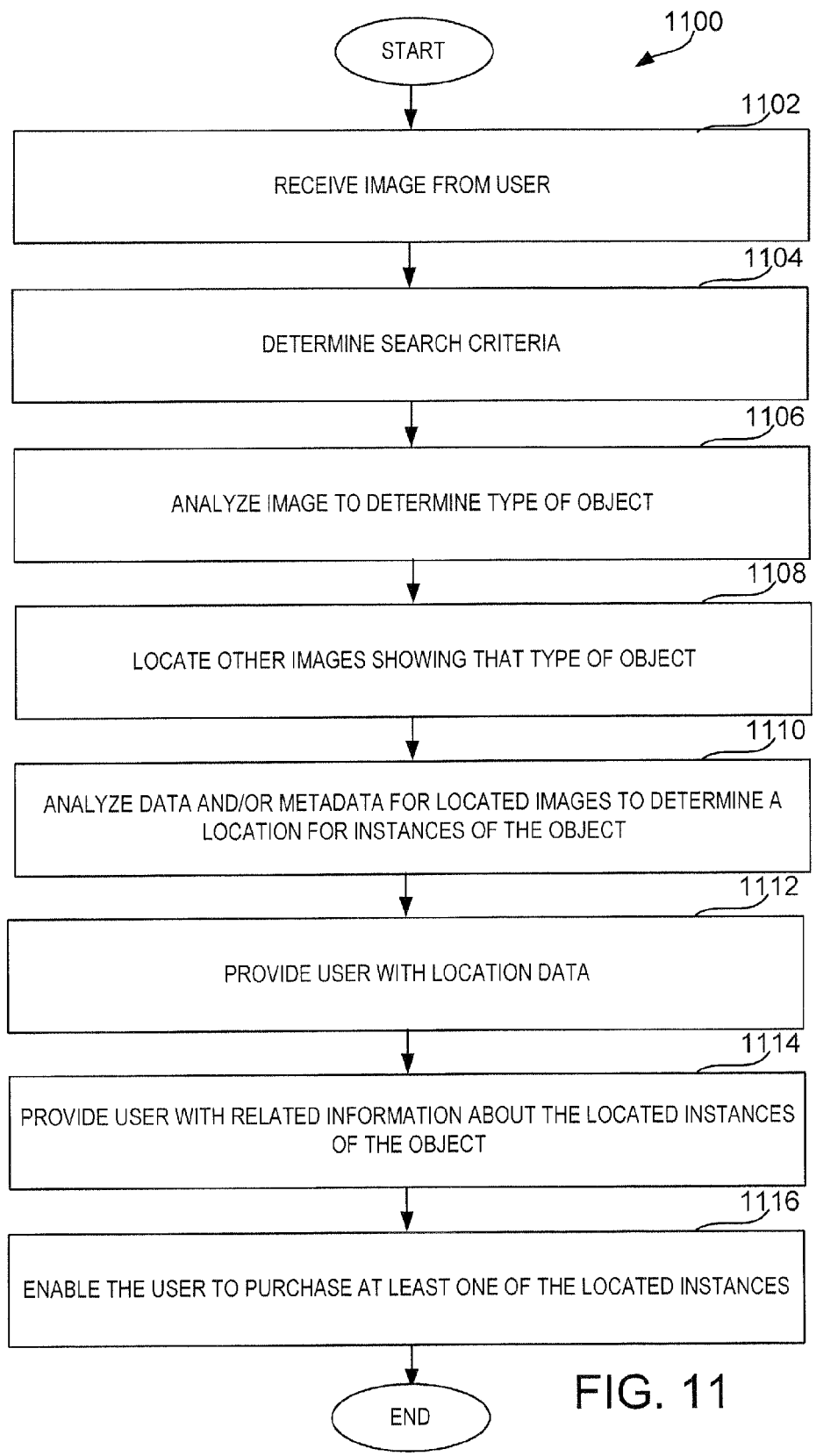
FIG. 11 illustrates a seventh method embodiment.

FIG. 11 illustrates a seventh method embodiment (1100). In this embodiment, a user is interesting in determining a location where a user can obtain an object of interest. The object can be any appropriate object able to be consumed (e.g., bought, rented, or leased) by the user, such as a car, a boat, an item of clothing, a house, and the like. In some embodiments, the user might utilize an application specific to locating a certain type of item, or might instead supply various criteria to be used in locating the type of object. The user can capture one or more images of the type of object, or can obtain one or more images of the object (e.g., from a Web site or digital magazine) and cause that image to be uploaded for analysis. The image can be received (1102) and search criteria determined (1104) from a user request. The image can be analyzed to determine a type of the object (1106), and that information can be used to locate other images showing that type of object (1108). The data and metadata of the located images can be analyzed to determine a location of each located instance of that type of object, at least that complies with the search criteria (1110). The user can then be provided with location data (1112) where one or more instances of that object were located within a geographical region or other otherwise comply with the specified criteria. In some embodiments, the user can also be provided with information (1114) enabling the user to purchase one of the located objects (1116) using a computing device, or other information such as the number of items in stock, pricing at different locations, etc.

Figure 12:
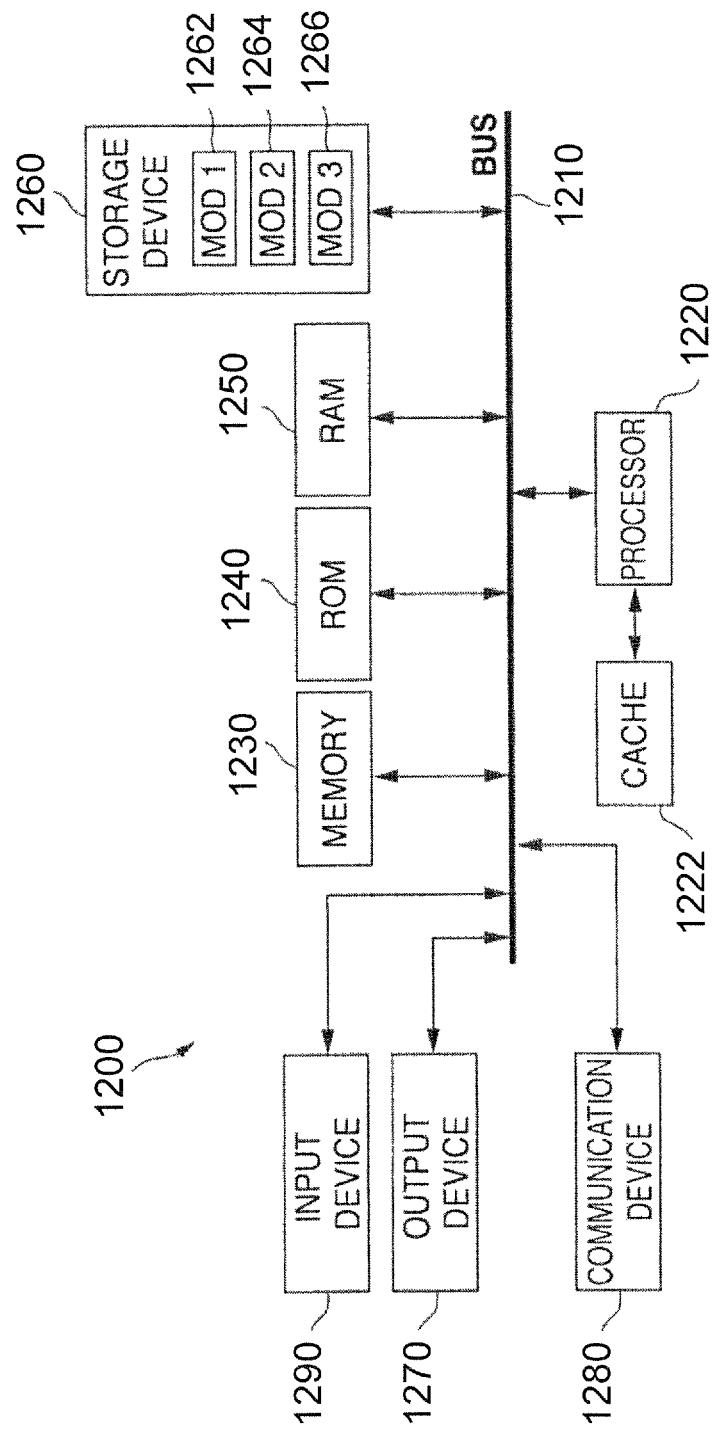
FIG. 12 illustrates an example system embodiment.

A brief description of a basic general purpose system or computing device in FIG. 12 which can be employed to practice the concepts is provided herein. FIG. 12 illustrates an example system 1200 such as a general-purpose computing device 1200, including a processing unit (CPU or processor) 1220 and a system bus 1210 that couples various system components including the system memory 1230 such as read only memory (ROM) 1240 and random access memory (RAM) 1250 to the processor 1220. The system 1200 can include a cache 1222 of high speed memory connected directly with, in close proximity to, or integrated as part of the processor 1220. The system 1200 copies data from the memory 1230 and/or the storage device 1260 to the cache 1222 for quick access by the processor 1220. In this way, the cache provides a performance boost that avoids processor 1220 delays while waiting for data. These and other modules can control or be configured to control the processor 1220 to perform various actions. Other system memory 1230 may be available for use as well. The memory 1230 can include multiple different types of memory with different performance characteristics. It can be appreciated that the disclosure may operate on a computing device 1200 with more than one processor 1220 or on a group or cluster of computing devices networked together to provide greater processing capability. The processor 1220 can include any general purpose processor and a hardware module or software module, such as module 1262, module 2 1264, and module 3 1266 stored in storage device 1260, configured to control the processor 1220 as well as a special-purpose processor where software instructions are incorporated into the actual processor design. The processor 1220 may essentially be a completely self-contained computing system, containing multiple cores or processors, a bus, memory controller, cache, etc. A multi-core processor may be symmetric or asymmetric.

The system bus 1210 may be any of several types of bus structures including a memory bus or memory controller, a peripheral bus, and a local bus using any of a variety of bus architectures. A basic input/output system (BIOS) stored in ROM 1240 or the like, may provide the basic routine that helps to transfer information between elements within the computing device 1200, such as during start-up. The computing device 1200 further includes storage devices 1260 such as a hard disk drive, a magnetic disk drive, an optical disk drive, tape drive or the like. The storage device 1260 can include software modules 1262, 1264, 1266 for controlling the processor 1220. A data store or database can include any repository for storing data, including a database, distributed storage systems, and other storage technologies. Other hardware or software modules are contemplated. The storage device 1260 is connected to the system bus 1210 by a drive interface. The drives and the associated computer readable storage media provide nonvolatile storage of computer readable instructions, data structures, program modules and other data for the computing device 1200. In one aspect, a hardware module that performs a particular function includes the software component stored in a non-transitory computer-readable medium in connection with the necessary hardware components, such as the processor 1220, bus 1210, display 1270, and so forth, to carry out the function. The basic components are known to those of skill in the art and appropriate variations are contemplated depending on the type of device, such as whether the device 1200 is a small, handheld computing device, a desktop computer, or a computer server.

Although the example embodiment described herein employs the hard disk 1260, it should be appreciated by those skilled in the art that other types of computer readable media which can store data that are accessible by a computer, such as magnetic cassettes, flash memory cards, digital versatile disks, cartridges, random access memory (RAM) 1250, read only memory (ROM) 1240, a cable or wireless signal containing a bit stream and the like, may also be used in the example operating environment. Non-transitory computer-readable storage media expressly exclude media such as energy, carrier signals, electromagnetic waves, and signals per se.

To enable user interaction with the computing device 1200, an input device 1290 represents any number of input mechanisms, such as a microphone for speech, a touch-sensitive screen for gesture or graphical input, keyboard, mouse, motion input, speech and so forth. An output device 1270 can also be one or more of a number of output mechanisms known to those of skill in the art. In some instances, multimodal systems enable a user to provide multiple types of input to communicate with the computing device 1200. The communications interface 1280 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 1220. The functions these blocks represent may be provided through the use of either shared or dedicated hardware, including, but not limited to, hardware capable of executing software and hardware, such as a processor 1220, that is purpose-built to operate as an equivalent to software executing on a general purpose processor. For example the functions of one or more processors presented in FIG. 12 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 1240 for storing software performing the operations discussed below, and random access memory (RAM) 1250 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 1200 shown in FIG. 12 can practice all or part of the recited methods, can be a part of the recited systems, and/or can operate according to instructions in the recited non-transitory computer-readable storage media. Such logical operations can be implemented as modules configured to control the processor 1220 to perform particular functions according to the programming of the module. For example, FIG. 12 illustrates three modules Mod 1262, Mod 2 1264 and Mod 3 1266 which are modules configured to control the processor 1220. These modules may be stored on the storage device 1260 and loaded into RAM 1250 or memory 1230 at runtime or may be stored as would be known in the art in other computer-readable memory locations.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

I claim:

1. A computer-implemented method for determining a location from which an object can be purchased, comprising:
   under control of one or more computer systems configured with executable instructions,
   receiving a first image captured by a user using a camera of a computing device;
   analyzing the first image using at least one object recognition algorithm to attempt to determine an identity of an object represented in the first image;
   locating a plurality of related images captured by other persons, each related image including a view of the object, the plurality of related images being located using at least one of: user-generated tags or descriptive text, computer-generated tags or descriptive text, or metadata of images submitted by other persons;
   generating a virtual model of the object represented in the first image based upon the first image and the plurality of related images;
   providing the virtual model of the object to the computing device to be presented to the user;
   determining purchasing data related to the object, the purchasing data associated with the plurality of related images, the purchasing data including at least one of pricing information, availability information, or location information for at least one instance of the object; and
   providing the purchasing data to the computing device for display to the user.

2. The computer-implemented method of claim 1, further comprising:
   enabling the user to purchase an instance of the object using the computing device based at least in part upon the purchasing data.

3. The computer-implemented method of claim 1, further comprising:
   enabling the user to specify at least one search criterion to be used with the first image in locating the at least one instance of the object.

4. The computer-implemented method of claim 1, further comprising:
   storing the first image, with the purchasing data, to a location accessible to multiple users.

5. A system comprising:
   at least one device processor; and
   a non-transitory computer-readable storage medium storing instructions that, when executed by the at least one processor, cause the system to:

receive a digital image associated with a user, the digital image including a view of an object;

perform at least one image matching process to locate at least one related image including at least one view of the object, the at least one related image selected from a plurality of related images that is located by using at least one of user-generated tags or descriptive text, computer-generated tags or descriptive text, or metadata of images submitted by other persons;

generate a virtual model of the object represented in the digital image based upon the digital image and the at least one related image;

provide the virtual model of the object to be presented to the user;

search a collection of image data to determine metadata associated with the at least one related image;

determine at least location information related to the object based at least in part upon the metadata; and provide at least the location information to be presented to the user.

6. The system of claim 5, wherein the instructions when executed further cause the system to:

provide other information about the object, with the location information, to the user.

7. The system of claim 5, wherein the instructions when executed further cause the system to:

send a request to a third party to provide the at least one related image including the view of the object.

8. The system of claim 5, wherein the instructions when executed further cause the system to:

receive information identifying the object from a plurality of third parties viewing at least one image including a view of the object.

9. The system of claim 5, wherein the instructions when executed further cause the system to:

enable the user to receive a notification when an instance of the object is detected in image data received from any of a plurality of sources.

10. The system of claim 9, wherein the instructions when executed further cause the system to:

enable the user to specify at least one criterion for use in determining when to send the user a notification.

11. The system of claim 10, wherein the at least one criterion includes at least one of a geographic region, a price range, or a physical aspect of the object.

12. The system of claim 5, wherein the digital image has intrinsic metadata including at least one of a time, a date, or a location where the digital image was captured, and wherein the collection of image data is further capable of being searched using the intrinsic metadata to locate images captured at substantially the same time and substantially the same location.

13. The system of claim 5, further comprising:

providing at least one related image for each instance of the content, the related images being aggregated as part of a slideshow, an album, a three-dimensional view, a multi-angle view, or a single enhanced image.

14. The system of claim 5, further comprising:

analyzing one or more images captured by the user within a period of time of a capture of the digital image to determine at least one of a time period or a geographic region associated with the digital image.

15. A non-transitory computer-readable storage medium having stored therein instructions which, when executed by at least one computing device, cause the at least one computing device to:

receive a query image from a user, the query image including a view of an object of interest to the user;

analyze the query image to identify the object of interest;

search for related images containing the object by using at least one of user-generated tags or descriptive text, computer-generated tags or descriptive text, or metadata of images submitted by other persons;

generate a virtual model of the object represented in the image based upon the query image and the related images;

provide the virtual model of the object to be presented to the user;

store metadata, associated with the related images, with the query image;

receive a subsequent image from another source;

detect an instance of the object of interest in the subsequent image by comparing the subsequent image, and any metadata received with the subsequent image, against the query image and the metadata stored with the query image; and notify the user of the detected instance of the object of interest.

16. The non-transitory computer-readable storage medium of claim 15, wherein the instructions when executed further cause the at least one computing device to:

determine a location of the object of interest based at least in part upon the metadata received with the subsequent image; and provide the location of the object of interest to the user.

17. The non-transitory computer-readable storage medium of claim 15, wherein the instructions when executed further cause the at least one computing device to:

enable the user to specify at least one criterion indicating how the user is to be notified of the detected instance of the object of interest.

18. The non-transitory computer-readable storage medium of claim 15, wherein the instructions when executed further cause the at least one computing device to:

enable the user to specify at least one criterion indicating an aspect that the object of interest must have before notifying the user of the detected instance of the object of interest.

19. The non-transitory computer-readable storage medium of claim 15, wherein the instructions when executed further cause the at least one computing device to:

receive at least a portion of the plurality of related images from a plurality of other users.

20. The non-transitory computer-readable storage medium of claim 15, wherein the instructions when executed further cause the at least one computing device to:

track a location of the instance of the object of interest over time based at least in part upon images provided by one or more users;

predict a future location of the instance based at least in part upon the location as tracked; and provide information about the predicted future location to the user.

* * * * *